UNITED STATES PATENT OFFICE.

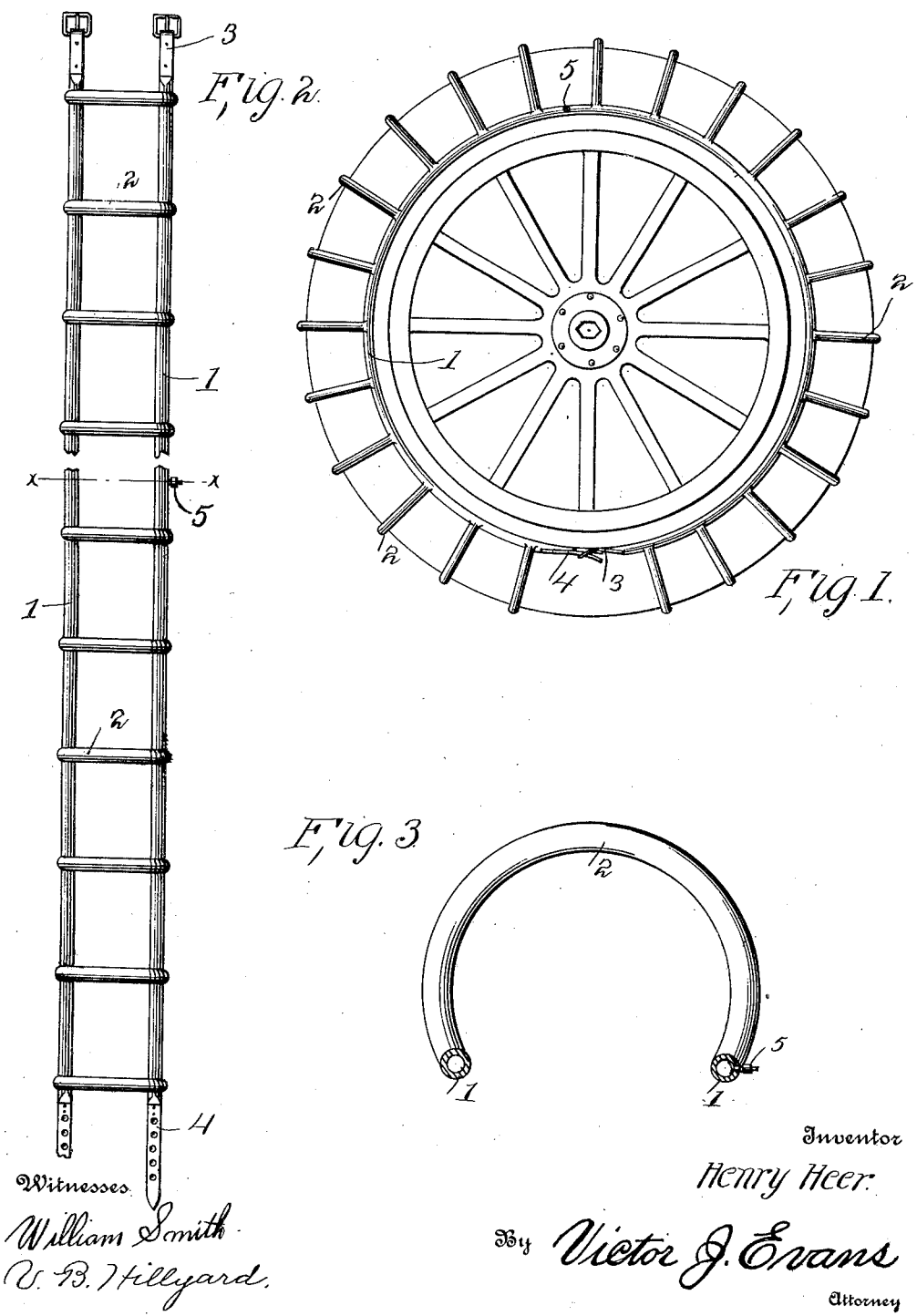

HENRY HEER, OF OGDEN, KANSAS.

WHEEL-ANTISKIDDER.

990,651.  Specification of Letters Patent.  Patented Apr. 25, 1911.

Application filed July 23, 1910. Serial No. 573,533.

*To all whom it may concern:*

Be it known that I, HENRY HEER, a citizen of the United States, residing at Ogden, in the county of Riley and State of Kansas, have invented new and useful Improvements in Wheel-Antiskidders, of which the following is a specification.

The present invention has for its primary intent to provide an attachment for soft tread tires to prevent slipping and to insure positive traction of the drive wheels of an automobile or kindred road machine.

A further purpose of the invention is the provision of a device of the character specified embodying side pieces and cross pieces, said attachment being of such formation as to increase the resiliency of the tire and to prevent injury thereto and to the rim of the wheel such as generally occasioned by the use of tire chains which chafe the rim of the wheel and become embedded in the tread of the tire.

The invention contemplates a pneumatic attachment embodying side pieces and cross pieces connecting the side pieces and adapted to extend over the tire, the side pieces being provided at their ends with attaching means for securing the same to the wheel to be equipped with the anti-skidding device.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of a wheel provided with an anti-skidding attachment embodying the invention. Fig. 2 is a plan view of the attachment extended. Fig. 3 is a cross section on the line *x—x* of Fig. 2 showing the parts on a larger scale.

Corresponding and like parts are referred to in the following description, and indicated in all the views of the drawing, by the same reference characters.

The device comprises side pieces 1 and cross pieces 2, the length of the side pieces depending upon the circumference of the wheel and the length of the cross pieces upon the diameter of the tire. The side and cross pieces are tubular and flexible so as to be inflated when required. Attaching means are provided at the ends of the side pieces 1 for securing the attachment about the wheel to which it may be fitted, said attaching means consisting of short straps 3 at one end provided with buckles and short straps 4 at the opposite ends of the side pieces and formed with a series of openings to make adjustable connection with the buckles, so that the diameter of the attachment may be varied and the device securely held in place when in position upon the wheel. The pieces 1 and 2 may be of any construction such as employed in the manufacture of pneumatic tires or flexible tubing or hose pipe, thereby admitting of the attachment being folded or rolled into compact form when not in use and to be inflated when in position upon the wheel. An air valve 5 is provided at a convenient point and may be of any construction such as employed in connection with pneumatic devices to admit of inflation by the application thereto of an air pump or other means for supplying air under pressure.

The device may be placed in position when deflated and after the attaching means have been properly secured and the device tightened the appliance may be inflated in any well known way, the process of inflation serving also to tighten the device upon the wheel. By reason of the pneumatic construction of the appliance it will be readily understood that the cross pieces 2 add materially to the resiliency of the wheel, while at the same time providing projecting portions to materially increase the traction of the wheel so as to prevent slipping. It will also be understood that by reason of the yieldable formation of the side pieces 1 chafing or marring of the rim of the wheel is prevented. The device bening constructed of textile and rubber is considerably lighter than the usual tire chains and moreover may be stored in a smaller space because when the device is deflated it may be formed into a small package either by folding or rolling.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. An anti-slipping device for soft tread vehicle wheels, the same comprising pneumatic side pieces, and cross pieces connecting the pneumatic side pieces.

2. An anti-slipping device for soft tread vehicle wheels, the same comprising side pieces and pneumatic cross pieces connecting the side pieces.

3. An anti-slipping device for soft tread vehicle wheels, the same comprising pneumatic side pieces and pneumatic cross pieces, the latter being in communication with the side pieces so that the several parts may be inflated at one operation.

In testimony whereof I affix my signature in presence of two witnesses.

HENRY HEER.

Witnesses:
R. McChesney,
M. C. Linscott.